United States Patent
Kaouas et al.

(10) Patent No.: US 9,155,329 B2
(45) Date of Patent: Oct. 13, 2015

(54) FLAVOUR COMPOSITIONS

(71) Applicant: Givaudan Nederland Services B.V., Naarden (NL)

(72) Inventors: Abdelmajid Kaouas, Utrecht (NL); Harry Renes, Lelystad (NL); Chris Winkel, Bussum (NL)

(73) Assignee: Givaudan, S.A., Vernier (CH)

( * ) Notice: Subject to any disclaimer, the term of this patent is extended or adjusted under 35 U.S.C. 154(b) by 0 days.

(21) Appl. No.: 14/457,279

(22) Filed: Aug. 12, 2014

(65) Prior Publication Data

US 2014/0349001 A1 Nov. 27, 2014

Related U.S. Application Data

(63) Continuation of application No. 12/065,189, filed as application No. PCT/NL2006/050216 on Sep. 4, 2006, now abandoned.

(30) Foreign Application Priority Data

Sep. 2, 2005 (EP) .................................. 05108087

(51) Int. Cl.
*A23L 1/226* (2006.01)
*A23L 2/56* (2006.01)
*A24B 15/00* (2006.01)

(52) U.S. Cl.
CPC ......... *A23L 1/22621* (2013.01); *A23L 1/22614* (2013.01); *A23L 2/56* (2013.01); *A24B 15/00* (2013.01); *A23V 2002/00* (2013.01)

(58) Field of Classification Search
USPC ........................................................ 426/535
See application file for complete search history.

(56) References Cited

U.S. PATENT DOCUMENTS

| 4,143,159 A | 3/1979 | Moller |
| 4,296,255 A | 10/1981 | Roswell |
| 5,780,090 A | 7/1998 | Frerot et al. |

FOREIGN PATENT DOCUMENTS

| CA | 2111774 A1 * | 6/1994 |
| WO | WO 92/06601 A1 | 4/1992 |
| WO | WO 97/04667 A1 | 2/1997 |
| WO | WO 2005/048737 A1 | 6/2005 |
| WO | WO 2005/102071 A1 | 11/2005 |
| WO | WO 2006/009425 A1 | 1/2006 |
| WO | WO 2006/046854 A1 | 5/2006 |

OTHER PUBLICATIONS

Rhlid, R.B., Fleury, Y., Blank, I., Fay, L.B., Welti, D.H., Vera, F.A., Juillerat, M.A. 2002. "Generation of Roasted Notes Based on 2-Acetyl-2-thiazoline and Its Precursor, 2-(1-Hydroxyethyl)-4,5-dihydrothiazole, by Combined Bio and Thermal Approaches", J. Agric. Food Chem. pp. 2350-2355, vol. 50.
Fein, M.L., Filachione, E.M., "Ester-amides of Lactic Acid", Journal of American Chemistry Society, pp. 2099-2101, vol. 75, 1953.
Fein, M.L., Filachione, E.M., "N-Substituted Lactamides", Journal of American Chemistry Society, pp. 2097-2099, vol. 75, 1953.
PCT/NL2006/050216, International Search Report, mailed on Jan. 18, 2007.
PCT/NL2006/050216, International Written Opinion, mailed on Jan. 18, 2007.
PCT/NL2006/050216, International Preliminary Report on Patentability, mailed on Mar. 4, 2008.

* cited by examiner

*Primary Examiner* — Nikki H Dees
(74) *Attorney, Agent, or Firm* — Curatolo Sidoti Co., LPA; Joseph G. Curatolo; Salvatore A. Sidoti

(57) ABSTRACT

Flavor modulation in foodstuffs, beverages, pharmaceutics, tobacco products and oral care products, using a flavor modulating substance selected from substances represented by formula (I) or formula (II), edible salts thereof and edible esters thereof:

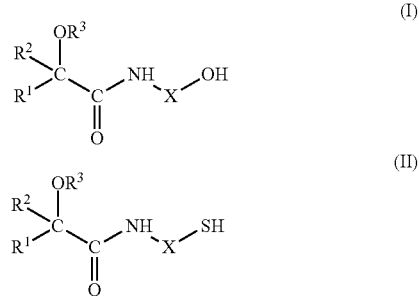

These substances are capable of imparting highly desirable taste attributes in the products in which they are incorporated. In addition the flavor modulating substances are capable of modulating and complementing the sensory impact of other taste imparting substances. The substances are applied in flavor compositions, foodstuffs, pharmaceutics, tobacco products and oral care products. Examples of flavor modulating substances include 2-hydroxy-N-(2-hydroxy-2-methylpropyl)-propanamide, N-lactoyl 1-amino-2-propanol, N-lactoyl 2-amino-1-propanol, N-lactoyl 2-amino-2-methylpropanol, N-gluconyl 1-amino-2-methyl-2-propanol, N-gluconyl 1-amino-2-propanol, N-gluconyl 2-amino-1-propanol, N-gluconyl 2-amino-2-methylpropanol, N-(2-mercaptopropyl)lactamide, edible salts thereof and edible esters thereof.

5 Claims, No Drawings

FLAVOUR COMPOSITIONS

CROSS REFERENCE TO RELATED APPLICATIONS

The present application is a continuation of co-pending U.S. Ser. No. 12/065,189, having a 371 date of Feb. 28, 2008, which is a 371 national phase application of International Patent Application PCT/NL2006/50216, filed Sep. 4, 2006, which claims priority from EP 05108087.7, filed Sep. 2, 2005, which are incorporated herein by reference.

FIELD OF THE INVENTION

The present invention relates to the field of improving the flavour of foodstuffs, beverages, pharmaceutics, tobacco products and oral care products. More particularly, the present invention provides flavour compositions that can be used to confer a fuller and richer taste to foodstuffs, beverages, pharmaceutics, tobacco products and oral care products. The flavour compositions according to the invention are characterised by the presence of one or more flavour modulating substances that are capable of improving and complementing the impact of other flavour imparting substances.

The present invention also encompasses the use of the aforementioned flavour modulating substances for improving the taste of foodstuffs, beverages, pharmaceutics, tobacco products and oral care products, as well as to foodstuffs, beverages, pharmaceutics, tobacco products and oral care products containing these substances.

BACKGROUND OF THE INVENTION

The flavour of foodstuffs and beverages consists of two parts: the aroma and the taste. In general what is perceived through the olfactory epithelium in the nasal cavity is referred to as 'aroma', whereas the term 'taste' is generally used to describe the sensory impact that is perceived via the mouth, especially the tongue. The flavour sensation experienced upon consumption, especially the taste, provides the final analysis of food prior to ingestion thereof. Visual and olfactory (smell) signals already give a first indication but only after intake of the food into the mouth the final decision is made either to ingest or to reject the food. Sweet taste is usually a signal that the food is safe (appetising) leading to ingestion of the food. The 'reactions' to salt and umami are really dependent on the strength of the signal. Bitter and sour are usually experienced as repulsive taste sensations that can lead to rejection. Temperature is another measure by which the food is judged just as well as aching sensations like capsaicin (hot pepper) and certain chemicals (like carbon dioxide).

In short, this means that taste is a very important and very complex system. Until recently most flavour research was focused towards aroma. Especially the last years a series of publications relating to molecules with a (positive) contribution to the taste of foodstuffs has emerged.

Such research has been stimulated significantly by the fact that quite some receptors which are involved in the different taste sensations have been characterized by now (B. Lindemann; Nature 413, 219 (2001)).

Another interesting aspect of taste is that it can have an impact on aroma. It was reported that people having artificially sweetened water in their mouth were significantly more sensitive to the smell of benzaldehyde than people having plain water in their mouth (P. Dalton et al, Nature Neurosci. 3, 431-432 (2000)).

Several screening systems have been described that make it possible to screen, in a short time, large series of molecules for their (modulating) effect on taste response (cf. WO04055048, GB2396414, W00177292 and US2004/0072254).

Most research on taste modulation so far has been devoted to taste enhancement in savoury products. Several, mainly Japanese, publications describe umami molecules, i.e. alternatives to mono sodium glutamate (MSG) (H Suzuki et al, J Agric Food Chem 50, 313-318 (2002); K Shima et al, J Agric Food Chem 46, 1465-1468 (1998); Y Ueda et al, Biosc Biotech Biochem 61 1977 (1997)).

In EP 1291342, a 'general taste enhancer' is disclosed that was reported to be suitable for enhancing sweetness as well.

In patent applications WO9704667 and WO04075663 tripeptides and amino acid condensates with lactic acid and succinic acid are described that have both their own taste as well as some enhancing properties. Alpha keto acids are reported to give body and mouthfeel to foodstuffs they are added to (US6287620).

Chlorogenic acids are claimed to enhance sweetness and to reduce bitterness (WO02100192).

Quite a bit of work has been devoted to find bitter taste suppressors (A. N. Pronin et al, Chemical Senses 29, 583-593 (2004); EP1401500; P. A. Breslin, Trends in Food Science & Technology 7, 390-399 (1996)).

In sweet and beverage products, further examples of the importance of the gustative dimension of flavourings have been reported. These examples include taste attributes such as bitterness, tingling and cooling-freshness.

Bitterness is an essential aspect of some food flavours, among which chocolate taste. Purine alkaloids, like theobromine and caffeine, as well as amino acids and peptides have been known for a long time as bitter substances. In British patent no. GB 1420909 it is disclosed that the bitter flavour of cocoa can be reproduced using a combination of a purine alkaloid and an amino acid or an oligopeptide which 'produces a surprisingly more natural simultaneously bitter and astringent flavour note than either of these types of substances alone'.

Menthol, an important constituent of peppermint oil, has a strong impact on flavoured products not only because of its mint smell but also because it imparts a cooling and fresh taste. Next to mint flavoured products, it has been suggested to employ menthol in other types of flavour to impart a cool taste. US patent application no. US2005013846 for example discloses how menthol and derivatives thereof can be used as flavouring in water continuous spreadable acidified food products to obtain table spreads exhibiting a fresh, cool taste impression.

Similarly, cinnamic aldehyde and eugenol, constituents of cinnamon oil, are used in flavouring composition for confectionery products, not only for their smell but also because they impart a warm and tingling taste. The oral pungency of cinnamic aldehyde was described as burning and tingling by Cliff M and Heymann H [Journal of Sensory Studies 7 (1992) 279-290]. According to the same authors eugenol exhibits a long-lasting numbing effect. Cinnamon oil has been proposed as a taste improving flavouring. International patent application no. WO9006689 discloses that cinnamon oil, among other spice extracts, added to a minty flavour formulation, can be used to improve the long-lasting flavour of chewing-gum.

There is still a need for new so-called flavour modulating substances that provide a positive contribution to the flavour, especially taste, of foodstuffs, beverages, pharmaceutics, tobacco products and oral care products they are incorporated in. One objective of the present invention therefore is to provide such substances and compositions comprising them.

SUMMARY OF THE INVENTION

The present inventors have surprisingly found that the substances according to formulas (I) and (II) and edible salts and esters thereof can be used advantageously to improve the flavour of foodstuffs, beverages, pharmaceutics, tobacco products and oral care products:

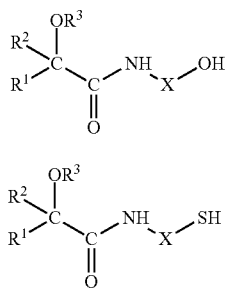

The present flavour modulating substances can advantageously be employed to impart desirable taste attributes in a wide variety of applications and products, especially food, beverages and confectionery. In addition, the present flavour modulating substances are capable of modifying the taste and/or aroma impact of other flavour ingredients contained within these same products, thereby improving the overall flavour quality of these products.

WO 92/06601 discloses certain amide based, non-caloric sugar substitutes derived from sugar carboxylic acids and amino alcohols, which possess similar physical rheological and colligative properties to sucrose. These substances may be used as sugar substitutes for formulated foods such as confectioneries, beverages, bakery products and the like, in order to simulate the structure, texture, freezing point depression, moisture retention, density, water solubility, solution viscosity properties, stability, non-reactivity and appearance characteristics of sucrose. Optionally these sugar substitutes may be used in combination with a high potency (artificial) sweetener, typical proportions thereof ranging from about 0.2 to 2.0 parts of artificial sweetener per 100 parts of the sugar substitute. WO 92/06601 discloses a foodstuff (yellow cake) comprising 28.3 wt % of the sugar substitute.

The present invention thus relates to the aforementioned flavour modulating substances and to flavour compositions, foodstuffs, beverages, pharmaceutics, tobacco products and oral care products comprising one or more of these flavour modulating substances. Other aspects of the present invention relate to the use of said flavour modulating substances for improving the flavour of foodstuffs, beverages, pharmaceutics, tobacco products and oral care products.

DETAILED DESCRIPTION OF THE INVENTION

Flavour modulating substances that can be used in accordance with the present invention are selected from the group of substances represented by the following formula (I) or (II), edible salts thereof and edible esters thereof:

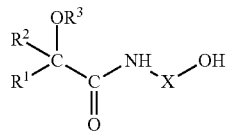

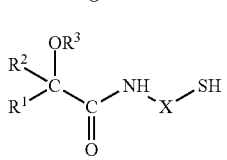

wherein
$R^1$ and $R^2$ independently represent hydrogen, $C_1$-$C_5$ alkyl or $C_1$-$C_5$ alkenyl each optionally substituted with one or more substituents selected from hydroxyl, oxo and $C_1$-$C_3$ carboxyl;
$R^3$ represents hydrogen or $C_1$-$C_3$ alkyl; and
X represents ethylene substituted with 1-4 substituents selected from methyl, ethyl and propyl.

A first aspect of the invention therefore provides a flavour modulating substance selected from the group of substances represented by said formulas (I) or (II), edible salts thereof and edible esters thereof, as defined here above, with the proviso that said substance is not N-[2-hydroxypropyl]-gluconamide, N-[2-hydroxypropyl]-glucoheptonamide, an edible salt thereof or an edible ester thereof.

Another aspect of the invention provides a composition comprising at least 0.001 ppm, preferably at least 0.01 ppm, more preferably at least 0.1 ppm, still more preferably at least 1 ppm of one or more flavour modulating substances selected from the group of substances represented by said formula (I) or formula (II), edible salts thereof and edible esters thereof, as defined here above, with the proviso that said one or more flavour modulating substances do not comprise N-[2-hydroxypropyl]-gluconamide, N-[2-hydroxypropyl]-glucoheptonamide, edible salts thereof and/or edible esters thereof. Still another aspect of the invention provides a flavour composition comprising i) at least 0.1 wt. % of one or more flavouring substances, optionally including saccharide sweetener in an amount of 0-20% by weight of the composition and/or artificial sweetener in an amount of 0-3% by weight of the composition; and ii) between 0.001 and 95 wt. % of one or more flavour modulating substances selected from the group of substances represented by formula (I) or (II), edible salts thereof and edible esters thereof, with the proviso that if the composition comprises N-[2-hydroxypropyl]-gluconamide, N-[2-hydroxypropyl]-glucoheptonamide, an edible salt thereof and/or an edible ester thereof, the ratio between these flavour modulating substances and the flavouring substances is less than 50:1.

According to a preferred embodiment the present (flavour) compositions do not comprise N-[2-hydroxypropyl]-gluconamide, N-[2-hydroxypropyl]-glucoheptonamide, edible salts thereof and/or edible esters thereof.

Throughout this document the term "flavouring substance" encompasses any substance that is not represented by formula (I) and that is capable of imparting a detectable flavour impact, especially at a concentration below 0.1 wt. %, more preferably below 0.01 wt. %, as well as sweeteners, including saccharide sweeteners and artificial sweeteners. Typically, the present flavouring substance belongs to one of the chemical classes of alcohols, aldehydes, ketones, esters, ethers, acetates, nitriles, terpene hydrocarbons, nitrogenous or sulphurous heterocyclic compounds and essential oils, and said flavouring substances can be of natural or synthetic origin. Many of these are listed in reference texts such as the book by S. Arctander, Perfume and Flavor Chemicals, 1969, Montclair, N.J., USA, or its more recent versions, or in other works of a similar nature, as well as in the abundant patent literature in the field of flavours.

The term "saccharide sweetener" as used in here refers to sweeteners that contain one or more saccharide units and that exhibit a sweetness potency that is of the same order of magnitude as the sweetness potency of sucrose. Typically, the sweetness potency of such saccharide sweeteners is between 20% and 500% the sweetness potency of sucrose.

The term "artificial sweetener" is used in here to refer to synthetic sweeteners that have a much higher sweetener potency than sucrose, especially a sweetness potency that exceeds the sweetness potency of sucrose by at least a factor 10, preferably by at least a factor 20.

Throughout this document the term "flavour" is to describe the sensory impact that is perceived via the mouth, especially the tongue, and the olfactory epithelium in the nasal cavity. The term "flavour modulating" as used herein refers to the capability of a composition or substance to alter the taste and/or aroma impact of other, flavour imparting, substances present within the same product, with the proviso that this change in taste and/or aroma impact is not caused by the flavour contribution of said flavour modulating composition or substance per se, but instead that it mainly results from the combined effect of on the one hand the flavour modulating composition or substance and on the other hand the other flavour imparting substances. The present substances combine the capability of modulating the taste and/or aroma impact of other, flavour imparting, substances and a taste contribution of their own. The favourable impact of the present flavour modulating substances is believed to be the result of the combination of these two effects.

Preferably, the flavour composition according to the invention contains at least 0.1 wt. % of the flavour modulating substances as defined above. Typically, the amount of the flavour modulating substances does not exceed 90 wt. %, preferably it does not exceed 40 wt. %, even more preferably the flavour composition comprises less than 25 wt % of the flavour modultaing substance, most preferably less than 5 wt %.

In a preferred embodiment the flavour composition according to the invention comprises flavouring substances in an amount of at least 0.5 wt. %, preferably at least 1 wt. %, based on the total weight of the composition. Preferably, the amount of flavouring substances does not exceed 95 wt %, more preferably it does not exceed 50 wt %.

Preferably, in the present flavour composition the flavour modulating substances and flavouring substances as defined herein before are employed in a weight ratio of less than 50:1, preferably less than 20:1. In a preferred embodiment said weight ratio is within the range of 1:100 to 10:1, more preferably within the range of 1:50 to 5:1. Most preferably, the flavour modulating substances and flavouring substances are employed in a weight ratio that does not exceed 1:1.

Preferably, in case the flavouring composition comprises a flavour modulating substance selected from N-[2-hydroxypropyl]-gluconamide, N-[2-hydroxypropyl]-glucoheptonamide, salts thereof and esters thereof, said flavouring composition comprising artificial sweetener, said ratio of the total amount of these flavour modulating substance(s) and the amount of artificial sweetener is less than 50:1, more preferably less than 20:1. Most preferably, the present flavouring composition contains essentially no artificial sweetener.

The flavour composition according to the present invention may suitably be prepared in the form of a liquid, a paste or a powder. In a particularly preferred embodiment the flavour composition is a free flowing powder. Typically, the present flavour composition comprises at least one flavour carrier, i.e. a material which does not significantly alter the organoleptic properties of the composition. Said carrier may be liquid or solid. Suitable examples include maltodextrin, modified starch, gum Arabic, ethanol and propylene glycol.

In a preferred embodiment, the present flavouring composition is selected from the group consisting of dairy flavourings, e.g. butter and milk flavourings, fruit flavourings, e.g. citrus and red fruit flavourings, savoury flavourings, e.g. meat and cheese flavourings, and bread flavourings.

It was found that particularly satisfying results can be obtained with flavour modulating substances according to formulas (I) and (II) wherein one of $R^1$ and $R^2$ represent $C_3$-$C_4$ alkyl or $C_3$-$C_4$ alkenyl substituted with 3 or 4 substituents selected from hydroxyl and oxo, more preferably butyl wherein each carbon atom is substituted with a substituent selected from hydroxyl and oxo and one of $R^1$ and $R^2$ represents hydrogen.

In another equally preferred embodiment $R^1$ and/or $R^2$ represent $C_1$-$C_2$ alkyl or $C_1$-$C_2$ carboxyl each optionally substituted with a hydroxyl group. Still more preferably one of $R^1$ and $R^2$ represent a methyl group. In a most preferred embodiment one of $R^1$ and $R^2$ represents hydrogen.

Preferably, in the aforementioned formulas (I) and (II), $R^3$ represents hydrogen.

According to yet another preferred embodiment, X in formula (I) or (II), represents ethylene, substituted with 1-4 methyl groups. More preferably X represents ethylene substituted with 2-4 methyl groups, more preferably X represents ethylene substituted with 2 methyl groups, most preferably X represents 1,1-dimethylethylene, or 2,2-dimethylethylene.

According to still another preferred embodiment of the invention, the one or more flavour modulating substances are selected from the group of substances represented by formula (I), edible alts thereof and edible esters thereof.

According to another preferred embodiment, the present invention relates to flavour modulating substances and to compositions comprising them, as defined herein before, wherein said flavour modulating substances are selected from the group of derivatives of α-hydroxycarboxylic acids, preferably lactic acid, malic acid, tartaric acid, citric acid, glucuronic acid, galactumic acid or an aldonic acid such as aldonic acid, altronic acid, gluconic acid, mannonic acid, gulonic acid, idonic acid, galactonic acid and talonic acid; and an amine selected from 2-methyl-2-aminopropanol, 2-methyl-1-amino-2-propanol and 2-methyl-2-aminopropyl dihydrogen phosphate; most preferably derivatives of lactic acid or gluconic acid and 2-methyl-2-amino-1-propanol; as well as edible salts and esters thereof.

According to a still more preferred embodiment said flavour modulating substances are selected from the group of 2-hydroxy-N-(2-hydroxy-2-methylpropyl)-propanamide, N-lactoyl 1-amino-2-propanol, N-lactoyl 2-amino-1-propanol, N-lactoyl 2-amino-2-methylpropanol, N-gluconyl 1-amino-2-methyl-2-propanol, N-gluconyl 1-amino-2-propanol, N-gluconyl 2-amino-1-propanol, N-gluconyl 2-amino-2-methylpropanol, N-(2-mercaptopropyl)lactamide, edible salts thereof and edible esters thereof. According to a particularly preferred embodiment of the invention, the flavour modulating substances are selected from the group of substances represented by formula (I), edible salts thereof, and edible esters thereof; even more preferably from the group of 2-hydroxy-N-(2-hydroxy-2-methylpropyl)-propanamide, N-lactoyl 1-amino-2-propanol, N-lactoyl 2-amino-1-propanol, N-lactoyl 2-amino-2-methylpropanol, N-gluconyl 1-amino-2-methyl-2-propanol, N-gluconyl 1-amino-2-propanol, N-gluconyl 2-amino-1-propanol, N-gluconyl 2-amino-2-methylpropanol edible salts thereof and edible esters thereof.

As used herein the term 'edible esters thereof' encompasses any edible derivative of the present flavour modulating substances and an acid. Typically said acid is an organic acid such as a substituted or non-substituted, linear or branched $C_1$-$C_6$ carboxylic acid, more preferably a $C_1$-$C_4$ carboxylic acid, most preferably a $C_1$-$C_3$ carboxylic acid, or alternatively an inorganic acid such as phosphoric acid. Such esters may be hydrolysed to produce flavour modulating substances according to the present invention during storage, processing and the like (acting as so called precursors).

According to a particularly preferred embodiment the present flavour modulating substance is selected from the group of substances represented by formulas (I) or (II) as defined herein before and edible salts thereof.

Yet another aspect of the present invention relates to the use of one or more of the aforementioned flavour modulating substances for improving the flavour of foodstuffs, beverages, pharmaceutics, tobacco products or oral care products. The inventors have found that the present flavour modulating substances are very useful ingredients which, in the presence of other flavouring substances, are capable of imparting highly appreciated taste sensations to the products in which they are incorporated, specifically "roundness", "fullness", "substance", "continuity", "ginger-like", "tingling", "fatty", "metallic", "umami" and/or "bitter". Because of this, the present flavour modulating substances can be employed to improve the taste of foodstuffs, beverages, pharmaceutics, tobacco products and oral care products. The flavour modulating substances of the present invention as such are capable of imparting highly desirable taste attributes. In addition, it has been found that the flavour modulating substances according to the invention are capable of modifying and complementing the sensory impact of other, flavour imparting, substances contained in the aforementioned products.

Because the flavour modulating substances according to the invention are not particularly volatile, they do not produce a strong aroma impact, even though they can affect the aroma impact of other, flavour imparting, substances. Here the term "aroma" refers to the aspect of taste that is perceived through the olfactory epithelium. Because of the low volatility of the present flavour modulating substances it is believed that the advantageous properties of these substances are somehow associated with the impact that these substances have on the sensory receptors located within the mouth.

As mentioned herein before, WO 92/06601 describes ingredients that, because of the physical properties thereof, could be used to replace sucrose as a structuring and/or texturizing agent in sweetened foodstuffs such as confectionery products, bakery products and beverages. Two of the substances described in this document are N-[2-hydroxypropyl]-gluconamide and/or N-[2-hydroxypropyl]-glucoheptonamide. In order to deliver the intended functionality these 'structuring agents' have to be applied in major amounts in food applications. For example, WO 92/06601 describes a yellow cake comprising 28.3 wt % of said structuring agent. With regard to taste characteristics, WO 92/06601 only mentions that the structuring agents disclosed therein, have a sweetness potency corresponding to 0-100% of that of sucrose, and that, in order to accomplish the same final effect as sucrose in formulated foods, an amount of artificial high potency sweetener might be included in proportions ranging between 0.2-2.0 parts of sweetener per 100 parts of the structuring agent.

The use of the present flavour modulating substances differs from this disclosure in that they are used only in minor amounts in order to impart a taste improving effect in combination with other (volatile) flavour substances. As mentioned before, at the levels at which the present flavour modulating substances are typically applied in foodstuffs, beverages, pharmaceutics and oral care products, the contribution thereof on structure and texture, i.e. on the physical properties, is essentially insignificant.

Yet another aspect of the present invention relates to a product selected from the group consisting of foodstuffs, beverages, pharmaceutics, tobacco products and oral care products, said product comprising between 0.1 and 10,000 ppm (mg/kg) of one or more flavour modulating substances as defined herein before. More preferably, the product contains at least 1 ppm, most preferably at least 5 ppm of the one or more flavour modulating substances. Typically, the aforementioned products contain the flavour modulating substance(s) in a concentration of not more than 5,000 ppm, preferably of not more than 2,000 ppm. The present products may further comprise one or more other flavouring substances, typically in amounts of 5-20,000 ppm, more preferably 10-10,000 ppm. The precise level in which the present substances are incorporated depends on the nature of the flavour modulating substance(s) and the nature of the product, as will be clear to the skilled person.

Preferably, in the present products the flavour modulating substances and flavouring substances as defined herein before are employed in a weight ratio of less than 50:1, preferably less than 20:1. In a preferred embodiment said weight ratio is within the range of 1:100 to 10:1, more preferably within the range of 1:50 to 5:1. Most preferably, the flavour modulating substances and flavouring substances are employed in a weight ratio that does not exceed 1:1.

The present products comprising N-[2-hydroxypropyl]-gluconamide, N-[2-hydroxypropyl]-glucoheptonamide, edible salts thereof and/or edible esters thereof preferably exhibit a weight ratio of said flavour modulating substances and other flavouring substances of less than 50:1, preferably less than 10:1.

In still another preferred embodiment, the present product contains no N-[2-hydroxypropyl]-gluconamide, N-[2-hydroxypropyl]-glucoheptonamide, edible salts thereof and edible esters thereof.

In another embodiment, said product does not contain added saccharide sweetener or artificial sweetener.

In yet another embodiment, the product contains N-[2-hydroxypropyl]-gluconamide, N-[2-hydroxypropyl]-glucoheptonamide, edible salts thereof and/or edible esters thereof in combination with added sweetener, said product being characterised by the fact that the weight ratio of the flavour modulating substances and saccharide sweetener does not exceed 1:1, preferably does not exceed 1:2; and by the fact that the weight ratio of the taste improving substances and artificial sweetener is less than 50:1, preferably less than 10:1, even more preferably less than 1:1.

Typical examples of foodstuffs according to the present invention include yoghurt, ice cream, desserts, confectioneries, bakery products, sweet snacks, seasonings, sauces, stock, soups, dressings and ready meals. The benefits of the present invention may also be realised in beverages, in oral care products such as toothpaste and mouthwash, in pharmaceutics such as pills and elixirs and in tobacco products, which includes any type of tobacco product for smoking as well as for non-smoking applications. It is noted that tobacco-like products are available for both smoking and non-smoking applications. The use of the present flavour modulating substances in these tobacco substitutes is also encompassed by the present invention.

Yet another aspect the present invention relates to a process of improving the flavour of a foodstuff, a beverage, a pharmaceutical product, a tobacco product or an oral care product, comprising adding to said product one or more flavour modulating substances as defined herein before. More preferably the present process comprises adding to said product an amount of at least 0.1 ppm (mg/kg), still more preferably at least 5 ppm, most preferably at least 10 ppm of the present one or more flavour modulating substances. It is furthermore preferred that said amount does not exceed 10,000 ppm (mg/kg), more preferably it does not exceed 5,000 ppm, most preferably it does not exceed 2,000 ppm.

Substances according to formulas (I) and (II) are suitably produced by reacting an α-hydroxycarboxylic acid represented by the following formula (III) and/or edible salts and/or esters thereof and an amine represented by the following formula (IV) or formula (V) respectively, and/or edible salts and/or esters thereof:

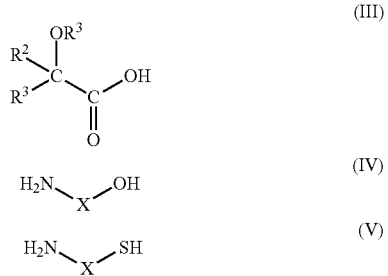

wherein R1, R2, R3 and X have the same meaning as defined herein before with regard to formulas (I) and (II).

Thus another aspect of the invention relates to the process of producing a flavour modulating substance, preferably a flavour modulating substance as defined herein before, comprising reacting an α-hydroxycarboxylic acid represented by formula (III) and/or edible salts and/or esters thereof and an amine represented by formula (IV) or formula (V) and/or edible salts and/or esters thereof. Preferably, in said process the α-hydroxycarboxylic acid is selected from the group of lactic acid, malic acid, tartaric acid, citric acid, glucuronic acid, galacturnic acid or an aldonic acid such as allonic acid, altronic acid, gluconic acid, mannonic acid, gulonic acid, idonic acid, galactonic acid and talonic acid; and the amine is selected from 2-methyl-2-aminopropanol, 2-methyl-1-amino-2-propanol, 2-methyl-2-aminopropyl dihydrogen phosphate and 1-aminopropane-2-thiol.

According to another preferred embodiment said reaction is performed by heating to reflux said reactants in an organic solvent, such as toluene, hexane or benzylalcohol, for a period of between 0.1-10 hours. The reaction product is typically obtained as a precipitate and can be isolated by evaporating the solvent and optionally further purified using any of the techniques known by the skilled person, such as chromatography and crystallization.

Another aspect of the present invention relates to substances obtainable by this process.

The invention is further illustrated by means of the following examples

EXAMPLES

Example 1

Preparation of N-lactoyl 1-amino-2-methyl-2-propanol a) Preparation of 1-amino-2-methyl-2-propanol from 2,2-dimethyl oxirane and ammonia The reaction was carried out in a closed tube placed in a steam reaction block. The tube was charged with 20 g of a 32% aqueous ammonia solution and 5 g 2,2-dimethyl oxirane and kept at a temperature of 95° C. for 2 hours. Then the tube was cooled to room temperature. The excess ammonia was evaporated by heating the reaction mixture to 70° C. Water was removed on a rotary evaporator. 4.5 g of 1-amino-2-methyl-2-propanol was obtained and analyzed by GC.

b) Preparation of N-lactoyl 1-amino-2-methyl-2-propanol 4.2 g crude 1-amino-2-methyl-2-propanol was added to 10.5 g ethyl lactate at room temperature. The mixture was heated to 130° C. and stirred for 3 hours at 125-130° C. The ethanol formed was distilled off during the reaction. The reaction mixture was cooled to room temperature and subsequently transferred to a 50 ml distillation flask. The excess of ethyl lactate was removed from the reaction mixture by distillation.

The remaining residue was cooled to room temperature and a sample was taken for analysis by NMR, which confirmed the formation of N-lactoyl 1-amino-2-methyl-2-propanol.

The crude product was then purified on a column filled with 50 g of silica gel 60 F254 (0.06-0.02 mm) in 200 ml THF. 2.4 g crude N-lactoyl 1-amino-2-methyl-2-propanol was dissolved in THF and then the solution was transferred to the top of the silica gel column. The column was eluted with THF and fractions of 20 ml were collected. A total of 22 fractions were collected. Finally the column was rinsed with 100 ml methanol. All fractions were checked by TLC. Fractions were selected and combined, based on the results of TLC analysis (shown below in table 1). Then the solvent was removed on the rotary evaporator to furnish the purified product. Only the obtained product from fractions 3 till 5 was sampled for NMR analysis.

TABLE 1 results of TLC analysis of fractionated extraction column eluent

| Fraction | Results on TLC | yield |
|---|---|---|
| Fractions 1 and 2 | no spot on TLC | |
| Fractions 3 till 5 | one spot on TLC | 1.8 g product |
| Fractions 6 till 9 | two spots on TLC | 0.3 g product |
| Fraction 10 till 22 | one spot on the baseline of TLC | 0.2 g product |

Example 2

Preparation of N-lactoyl 1-amino-2-propanol 22.6 g 1-amino-2-propanol was added to 56.5 g ethyl lactate at room temperature. The mixture was heated to reflux and stirred for 4 hours. The reaction mixture was cooled and left to stand overnight at room temperature. The following day the ethanol formed and the excess of ethyl lactate were removed from the reaction mixture by distillation, using a 20 cm vigreux column 43 g of N-lactoyl 1-amino-2-propanol (pale brown viscous liquid) was collected as residue and cooled to room temperature. The purity of the obtained product was confirmed by NMR analysis.

Example 3

Preparation of N-lactoyl 2-amino-1-propanol 3.7 g ethyl lactate and 2.1 g 2-amino-1-propanol were mixed and subsequently heated to 110-115° C. for 2.5 hours. During the reaction, the ethanol formed was distilled off. After the reaction the excess of ethyl lactate was removed by vacuum distillation (bottom temperature: 150° C., 1 mbar), using a 20 cm vigreux column. 3.9 g of residual N-lactoyl 2-amino-1-propanol (brown viscous liquid) was collected, the purity of which was confirmed by NMR analysis. The yield of the reaction was 95%

Example 4

Preparation of N-lactoyl 2-amino-2-methylpropanol 15 g of ethyl lactate and 10 g of 2-amino-2-methyl-1-propanol were mixed and subsequently heated to 110-115° C. for 3.5 hours. During the reaction, the ethanol formed was distilled off. After the reaction, the excess of ethyl lactate was removed by vacuum distillation (bottom temperature: 160° C., 7 mbar), using a vigreux column. 15.5 g of residual brown viscous liquid was collected, which was confirmed to be pure N-lactoyl 2-amino-2-methylpropanol by NMR analysis.

Example 5

Preparation of N-gluconyl 1-amino-2-methyl-2-propanol 4 g delta-gluconolactone and 2 g 1-amino-2-methyl-2-propanol were mixed and subsequently heated to 72° C. for 3 hours. The mixture was allowed to cool to room temperature and placed in the freezer overnight. The formed white crystals were filtered off, washed with ethanol and dried in the vacuum oven at 65° C. for 4 hours. The dried product (3.5 g of white crystals) was sampled for NMR and confirmed to be N-gluconyl 1-amino-2-methyl-2-propanol. The yield of the reaction was 67%.

Example 6

Preparation of N-gluconyl 1-amino-2-propanol 18 g of delta-gluconolactone and 7.6 g of 1-amino-2-propanol were mixed in 110 g of ethanol and subsequently heated to 70° C. for 5 hours. The mixture was allowed to stand at room temperature for 48 hours. A white precipitate had formed which was filtered off, washed with ethanol and dried in the vacuum oven at 70° C. for 4 hours. 16 g of product (white crystals) was obtained. The product was sampled for NMR and confirmed to be pure.

The mother liquor was partially evaporated and placed in a freezer overnight. 2 g of extra product (white crystals) was isolated. 17.9 g (0.071 mole) of N-gluconyl 1-amino-2-propanol was prepared. The material was pure, according the NMR analysis. The chemical yield of the reaction was 70%.

Example 7

Preparation of N-gluconyl 2-amino-1-propanol 2.4 g of delta-gluconolactone and 1 g of 2-amino-1-propanol were mixed in 30 g ethanol and subsequently heated to 70° C. for 5 hours. The unreacted gluconolactone (a white precipitate) was filtered off. The filtrate was placed in a freezer overnight. The formed white crystals were filtered off and dried in the vacuum oven at 70° C. The dried material (1 g) was sampled for NMR analysis. The chemical yield was 30%.

Example 8

Preparation of N-gluconyl 2-amino-2-methylpropanol 4 g of delta-gluconolactone and 2 g of 2-amino-2-methyl-1-propanol were mixed in 30 g ethanol and subsequently heated to 70° C. for 5 hours. The mixture was allowed to cool to room temperature and placed in a freezer for a weekend. No crystals were formed. Then the solvent was evaporated and the residue was sampled for NMR. To isolate the unreacted gluconolactone (30% in the obtained residue, according the NMR analysis), the residue was dissolved in IPA and placed in the freezer overnight. A paste-like product was obtained which was filtrated, washed and dried under vacuum. The dried product (3.5 g of a brown paste) was sampled for NMR and confirmed to contain mainly N-gluconyl 2-aurin-2-methylpropanol.

Example 9

Four yoghurt samples were prepared:
A: Yoghurt 0% fat+strawberry flavour+sucralose (25%) 300 ppm
B: Yoghurt 0% fat+strawberry flavour+sucralose (25%) 300 ppm+10 ppm N-gluconyl 2-amino-2-methyl-propanol (as prepared in Example 8)
C: Yoghurt 0% fat+strawberry flavour+4% sugar
D: Yoghurt 0% fat+strawberry flavour+4% sugar+10 ppm N-gluconyl 2-amino-2-methyl-propanol (as prepared in Example 8)

The yoghurts were tasted by a professional panel. There was general agreement among the group on the taste descriptions:
A: sweet, bitter, metallic, aftertaste.
B: fuller more round and natural taste, more sugar sweetness, significantly less bitter metallic aftertaste compared to A.
C: tart, acidic.
D: fuller more round and natural taste, more intense sweet compared to C.

Example 10

Three ice cream (8% vegetable fat) samples were prepared:
A: Ice cream (see table 2)+strawberry flavour
B: Ice cream (see table 2)+strawberry flavour+7 ppm N-gluconyl 1-amino-2-methyl-2-propanol (as prepared in Example 5)

The ice creams were tasted by a professional panel. There was general agreement among the group on the taste descriptions:
A: sweet, strawberry, creamy aftertaste.
B: more round and natural taste, very clear sweet enhancement and increased creaminess.

TABLE 2

| Ice cream composition: | % |
|---|---|
| Hydrogenated coconut fat (CN32) | 8.00 |
| Skimmed milkpowder | 7.00 |
| Whey protein concentrate | 3.00 |
| Sucrose | 12.00 |
| Corn syrup solids (DE39) | 5.00 |
| Sherex IC 9328 | 0.50 |
| Flavour | + |
| Colour | + |
| Water | Up to 100 |

Example 11

A standard chicken soup was prepared. The quantity was split in two. One part was kept as reference and the other part was dosed to contain 5 ppm of N-gluconyl 2-amino-2-methyl-propanol (as prepared in Example 8). The soups were tasted by a professional panel.

The soup containing the N-gluconyl 2-amino-2-methyl-propanol was unanimously described as more tasteful, more complete, more body, more fatty.

Example 12

Two aqueous solutions were prepared:
A. 0.5% NaCl
B. 0.5% NaCl and 12 ppm of N-lactoyl 2-amino-2-methyl-propanol (as prepared in Example 4)
The solutions were tasted by a sensory panel:
Solution A was described as: "salty",
Solution B was described as: "high impact", "bouillon", "meaty", "salty", "umami" and "salivating".

Example 13

Two different soft drinks A and B were prepared by adding respectively 40 ppb and 4 ppm of N-lactoyl 2-amino-2-methyl-propanol (as prepared in Example 4) to a commercially available carbonated orange flavoured soft drink.

The three soft drinks were evaluated and compared to the original drink Sample A was judged as more natural, with a more juicy character than the original. Sample B exhibited the tingling character typical of the flavour modulating substances of the present invention, which was judged as very pleasant and particularly well suited for the orange flavour.

The invention claimed is:

1. A flavour composition comprising i) at least 0.1 wt. % of one or more flavouring substances, optionally including a saccharide sweetener in the amount of 0-20% by weight of the composition and/or an artificial sweetener in the amount of 0-3% by weight of the composition; and
   ii) at least 0.1 wt. % and not exceeding 90 wt. % of one or more flavour modulating substances of formula (II), edible salts thereof, or edible esters thereof:

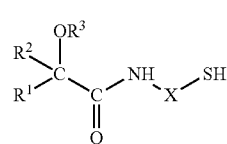

(II)

wherein $R^1$ and $R^2$ independently represent hydrogen, C1-C5 alkyl or C1-C5 alkenyl, each optionally substituted with one or more substituents selected from hydroxyl, oxo and C1-C3 carboxyl; $R^3$ represents hydrogen or C1-C3 alkyl; and X represents an ethylene radical substituted with 1-4 substituents selected from methyl, ethyl and propyl.

2. The flavour composition according to claim 1, wherein the one or more flavour modulating substances are selected from the group consisting of N-(2-mercaptopropyl)lactamide, edible salts thereof and edible esters thereof.

3. A product of foodstuffs, beverages, pharmaceutics, tobacco products, and oral care products comprising one or more flavour modulating substance in an amount between 0.1-10,000 ppm, wherein the flavour modulating substance is selected from the group consisting of N-(2-mercaptopropyl)lactamide, edible salts thereof and edible esters thereof.

4. The product according to claim 3, wherein the one or more flavour modulating substance is in an amount between 1-5,000 ppm.

5. The flavour composition according to claim 1, wherein the flavour modulating substances is in an amount of 0.1-25 wt. %.

* * * * *